(12) United States Patent
Kamiya (10) Patent No.: US 6,317,653 B1
(45) Date of Patent: Nov. 13, 2001

(54) CONTROL SYSTEM FOR ADJUSTING A REACTION FORCE ACTING ON A WORKING END OF A ROBOT

(75) Inventor: Koji Kamiya, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/551,714

(22) Filed: Apr. 18, 2000

(30) Foreign Application Priority Data

Apr. 19, 1999 (JP) ................................................. 11-110790

(51) Int. Cl.[7] ............................ G05B 15/00; G05B 19/00
(52) U.S. Cl. ............................ 700/260; 700/95; 700/164; 700/186; 700/245; 700/258; 700/262; 566/568; 566/568.1; 566/568.11; 566/568.12; 566/568.17; 566/568.22; 901/41; 901/47; 414/730
(58) Field of Search ..................... 700/245, 95, 260, 700/262, 186, 164, 258; 318/566, 568.11, 568.17, 568.18, 568.1, 568.12, 568.22, 628; 414/730; 483/1, 55, 59; 340/407.1, 407.2, 680, 825.19; 901/41, 47; 29/712; 702/84; 434/112, 116

(56) References Cited

U.S. PATENT DOCUMENTS

| | | | |
|---|---|---|---|
| 5,291,112 | * | 3/1994 | Karidis et al. .................... 318/568.1 |
| 5,451,924 | * | 9/1995 | Massimino et al. ............... 340/407.1 |
| 5,668,453 | * | 9/1997 | Muto et al. ....................... 318/568.17 |
| 5,860,900 | * | 1/1999 | Dunning et al. .......................... 483/1 |
| 5,917,726 | * | 6/1999 | Pryor ....................................... 700/59 |
| 5,923,139 | * | 7/1999 | Colgate et al. ....................... 318/566 |

FOREIGN PATENT DOCUMENTS

| | | |
|---|---|---|
| 6-39760 | 2/1994 | (JP) . |
| 6-246673 | 9/1994 | (JP) . |

OTHER PUBLICATIONS

Ito et al., A standing posture control based on grond reaction force, 2000, IEEE, pp. 1340–1345.*
Lee et al., Force–guided robotic assembly basedon perturbation/correlation, 1997, IEEE, p 75.*
Lee et al., A pertubation/correlation method for force guided robot assembly, 1999, IEEE, pp. 764–773.*
Lee et al., Assembly automation using petubation/correlation, 1997, IEEE, pp. 661–667.*
Lee et al., Assembly of parts with irregular surfaces using actuve force sensing, 1994, IEEE, pp. 2369–2644.

* cited by examiner

Primary Examiner—William A. Cuchlinski, Jr.
Assistant Examiner—McDieunel Marc
(74) Attorney, Agent, or Firm—Law Offices of David G. Posz (57) ABSTRACT

A correct track calculating section calculates a correction amount in accordance with a reaction force acting on the working end of a robot. The correction amount is added to a given provisional target position so as to reduce the reaction force. When the reaction force increases excessively, an on-off switch is closed and a selector switch is switched to decelerate and stop the working end of the motor at a virtual position.

4 Claims, 4 Drawing Sheets

P1···PRESENT POSITION
COMMAND POSITION WHEN REACTION FORCE REACHES THRESHOLD
Pr···VIRTUAL PRESSING POSITION
ΔP (CORRESPOND TO 8N)
ΔP' (CORRESPOND TO 10N)

FIG. 6

CONTROL SYSTEM FOR ADJUSTING A REACTION FORCE ACTING ON A WORKING END OF A ROBOT

BACKGROUND OF THE INVENTION

The present invention relates to a robot control system which is capable of feedback controlling each articulated joint so as to equalize the detected position to a position command. More specifically, the present invention gives adequate compliance characteristics to the robot control system.

The industrial robots are used in various stages of manufacturing, e.g., in an assembling process or in a machining process, in which the robot is often subjected to an operation for pressing a workpiece on a designated surface.

For example, a workpiece needs to be fitted into a chuck of a lathe. To this end, the robot performs a shifting operation of the workpiece in the following manner. First, the robot moves a workpiece toward the chuck and stops it when the workpiece hits the front surface of the chuck. Next, the robot changes the shifting direction of the workpiece (usually perpendicularly) so that the workpiece slides along the chuck surface under a significant pressing force until the workpiece engages in position with the chuck.

In general, each industrial robot handles or carries various kinds of workpieces. Hence, in the above-described shifting operation of the robot, the stop position of the working end at the moment the workpiece hits the chuck surface varies depending on the size of each workpiece.

Using a visual device or a sensor for detecting the size of each workpiece may be preferable to adjust the stop position of the working end of the robot. However, the cost increases.

The unexamined Japanese patent publication No. 6-39760 discloses an impedance control system for feedback controlling a pressing force of the workpiece acting on the designated surface. However, the robot receives a reaction force which varies depending on the impedance parameter and a position change amount. This makes it difficult to finely adjust the reaction force. Furthermore, when the present position is largely offset from the target position, the reaction force may increase excessively.

SUMMARY OF THE INVENTION

An object of the present invention is to provide a robot control system which realizes an easy adjustment of the reaction force acting on the working end of the robot and also prevents the reaction force from increasing excessively.

In order to accomplish this and other related objects, the present invention provides a first robot control system comprising a position detecting means for detecting a present position of each articulated joint of a robot, and an actuating means for feedback controlling the articulated joint of the robot to shift a working end of the robot to a target position based on the present position detected by the position detecting means. According to the first robot control system of the present invention, a reaction force detecting means is provided for detecting a reaction force acting on the working end of the robot. A position correcting means is provided for setting a position correcting amount corresponding to the reaction force detected by the reaction force detecting means. An adding means is provided for producing a target position by adding the position correcting amount obtained by the position correcting means to a given provisional target position. A provisional target position correcting means is provided for obtaining a virtual position of the working end of the robot based on a present target position generated from the adding means. The virtual position is a position where the reaction force detected by the reaction force detecting means becomes equal to a predetermined limit value. A switching means is provided for sending the virtual position obtained by the provisional target position correcting means to the adding means, instead of sending the given provisional target position, when the reaction force detected by the reaction force detecting means exceeds a predetermined value smaller than the limit value.

Furthermore, the present invention provides a second robot control system comprising an impedance control section and an action interrupt section.

The impedance control section comprises a reaction force detecting means for detecting a reaction force acting on the working end of the robot, a position correcting means for setting a position correcting amount corresponding to the reaction force detected by the reaction force detecting means, a target position generating means for producing a target position of the working end of the robot based on the position correcting amount obtained by the position correcting means, a position command generating means for sending a designated position of each articulated joint of the robot based on the target position of the working end, a position detecting means for detecting a present position of each articulated joint of the robot, and an actuating means for feedback controlling the articulated joint to eliminate a difference between the designated position sent from the position command generating means and the present position detected by the position detecting means.

The action interrupt section comprises an action interrupt judging means for checking whether the reaction force exceeds a predetermined threshold. A provisional target position correcting means is responsive to the judgement of the action interrupt judging means for obtaining a virtual position of the working end of the robot when the reaction force exceeds the predetermined threshold. And, a switching means is responsive to the judgement of the action interrupt judging means for sending the virtual position obtained by the provisional target position correcting means to the target position generating means when the reaction force exceeds the predetermined threshold.

Preferably, in the second robot control system, the virtual position is a position where the reaction force detected by the reaction force detecting means becomes equal to a predetermined limit value.

Preferably, in the second robot control system, the threshold is smaller than the limit value.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

A preferred embodiment of the present invention will be explained hereinafter with reference to attached drawings.

Figure 6:
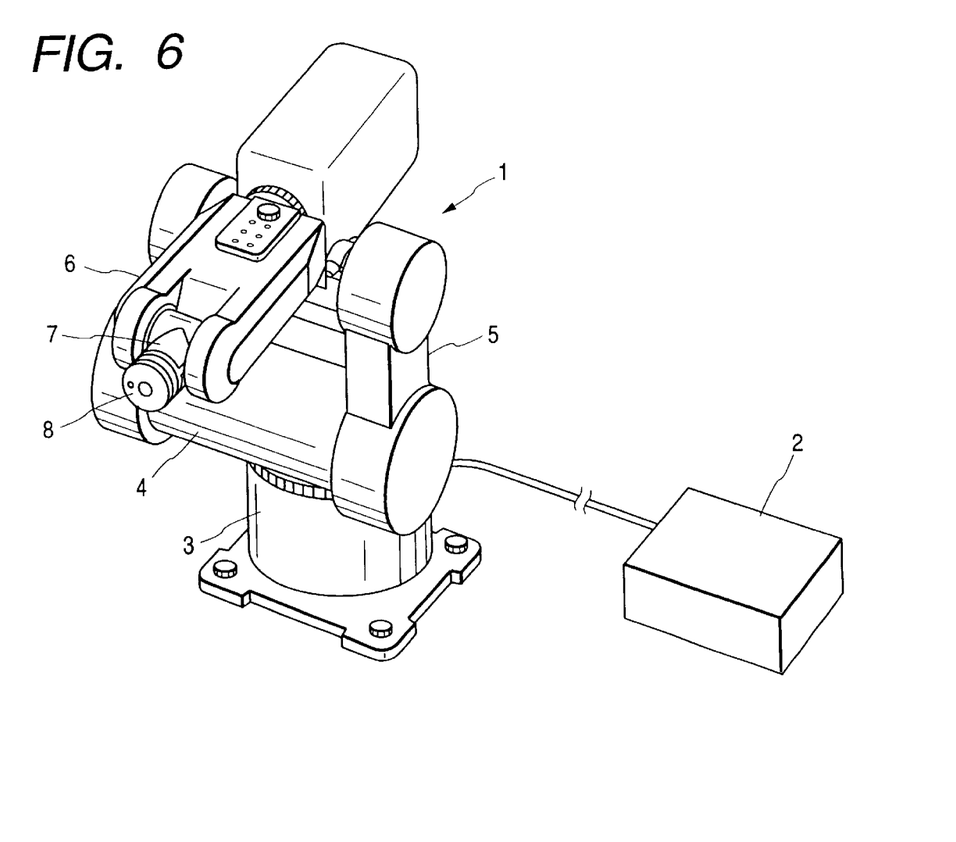
FIG. 6 is a perspective view showing a robot and its control unit in accordance with the preferred embodiment of the present invention.

As shown in FIG. 6, a robot system consists of a robot 1 and a control unit 2 which are connected by cable (or wireless). The robot 1, serving as an assembly robot (i.e., one of vertical articulated robots), comprises a base 3, a shoulder 4 rotatably mounted on the base 3 so as to rotate in a horizontal plane, a lower arm 5 hingedly mounted on the shoulder 4 so as to cause a swing motion about the shoulder 4 in a vertical plane, an upper arm 6 hingedly mounted on the distal end of the lower arm 5 so as to cause a swing motion about the lower arm 5 in a vertical plane as well as causing a twist motion about its axis, and a wrist 7 rotatably supported between bifurcated distal ends of the upper arm 6 so as to cause a swing motion about the upper arm 6. A flange 8, serving as a working end of the robot 1, is rotatably attached to the front end of the wrist 7 to support a robot hand (not shown) which holds or grips a workpiece.

The robot 1 comprises a plurality of articulated joints to realize the horizontal rotation of the shoulder 4, the vertical swing motion of the lower arm 5, the vertical swing motion and the twist motion of the upper arm 6, the swing motion of the wrist 7, and the rotation of the flange 8. Each articulated joint is actuated by a motor 9 (refer to FIG. 1), e.g., DC servo motor, via an appropriate transmission mechanism (not shown).

Figure 1:
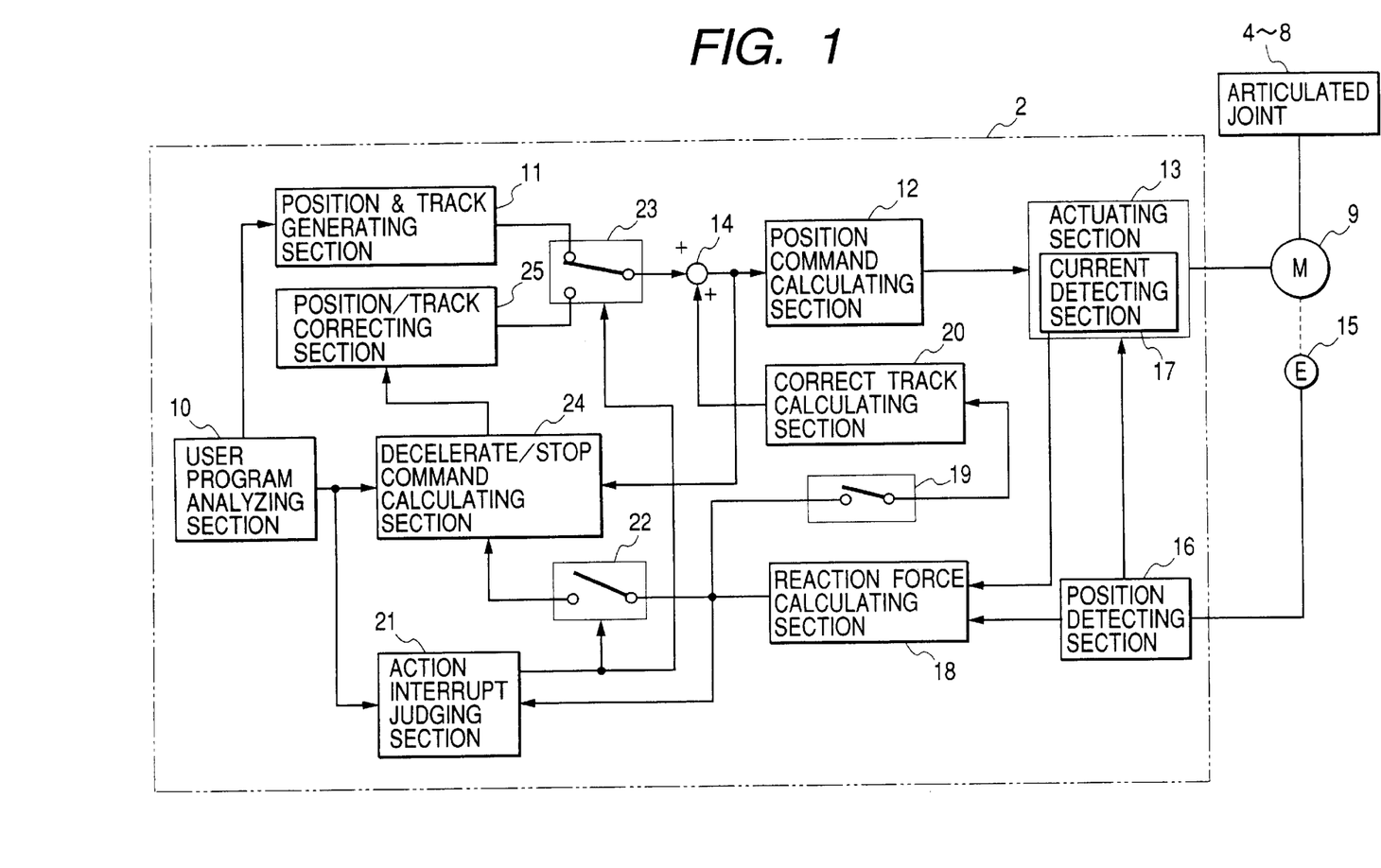
FIG. 1 is a block diagram showing the circuit arrangement of a robot control system in accordance with a preferred embodiment of the present invention.

The control unit 2, as shown in FIG. 1, comprises a user program analyzing section 10, a position/track generating section 11, a position command calculating section 12, and an actuating section 13. The user program analyzing section 10 reads each action command from an action program of the robot produced by a user, and obtains various data including an initial position (i.e., an action start position) and a final position (i.e., an action end position) of the working end (i.e., flange) 8 of the robot 1. The position/track generating section 11 receives the readout data from the user program analyzing section 10 and determines a speed pattern, e.g., a trapezoidal pattern, for shifting the working end 8 of the robot 1 from the initial position to the final position. To realize the speed control based on this speed pattern, the position/track generating section 11 further calculates a predictive position (i.e., a sampling position) of the working end 8 of the robot 1 to be reached at predetermined time intervals.

In response to elapse of each predetermined time, the position/track generating section 11 sends the next sampling position as a provisional target position to the position command calculating section 12 via an adder 14. The position command calculating section 12 receives the provisional target position given from the adder 14 as a target position of the working end 8 of the robot 1. The position command calculating section 12 obtains a calculative position of each articulated joint based on the target position of the robot working end 8. The calculative position of each articulated joint, thus obtained by the position command calculating section 12, is sent as a command position to the corresponding actuating section 13.

FIG. 1 shows a block of the articulated joint corresponding to each of the shoulder 4, the lower arm 5, the upper arm 6, the wrist 7, and the flange 8. FIG. 1 shows two blocks associated with the articulated joint, i.e., a block of the motor 9 and a block of the actuating section 13.

A rotary encoder 15 is provided as a position sensor which detects the actual position of the motor 9. Each rotary encoder 15 generates a pulse signal responsive to a rotational angle of the motor 9. The pulse signal is sent to a position detecting section 16 which serves as a position detecting means. The position detecting section 16 detects the present position of each articulated joint based on the pulse signal entered from the rotary encoder 15. The position detecting section 16 sends the detected present position to the actuating section 13 of the motor 9.

The actuating section 13 compares the command position (i.e., calculative position) given from the position command calculating section 12 with the present position (i.e., actual position) detected by the position detecting section 16. The actuating section 13 supplies current (i.e., electric power) to each motor 9 based on a detected difference between the command position and the present position. The current detecting section 17, provided in the actuating section 13, serves as a motor current detecting means for measuring the current flowing through the motor 9.

The control unit 2 further comprises a reaction force calculating section 18 which operates in an impedance control mode of the robot 1 to detect a reaction force acting on the working end 8 of the robot 1. More specifically, the reaction force calculating section 18 receives the present position information of each articulated joint set from the position detecting section 16 as well as the motor current information of each articulated joint sent from the current detecting section 17. The reaction force calculating section 18 calculates the reaction force acting on the working end 8 of the robot 1 based on the present position information and the motor current information of the motor 9.

More specifically, the reaction force is obtained by introducing the following formulas.

$$\mu=(\mu 1, \mu 2, \ldots, \mu n) \quad (1)$$

$$\pi=(\pi 1, \pi 2, \ldots, \pi n)=K\mu \quad (2)$$

From the above formulas (1) and (2), $$\pi=(K1 \cdot \mu 1, K2 \cdot \mu 2, \ldots, Kn \cdot \mu n)$$

where $\mu$ represents the motor current vector of each articulated joint, $\pi$ represents the torque vector of each articulated joint, $\mu 1, \mu 2, \ldots$ and $\mu n$ represent the current of each motor, and $\pi 1, \pi 2, \ldots$ and $\pi n$ represent the torque of each articulated joint.

When $\pi a$ is a torque for actuating the articulated joint, $$\pi a = f(\Theta, \dot{\Theta}, \ddot{\Theta})$$

where $\Theta=(\theta 1, \theta 2, \ldots, \theta n)$ $\Theta$ represents the angular vector of each articulated joint, and $\theta 1, \theta 2, \ldots$ and $\theta n$ represent the angle of each articulated joint.

Accordingly, the torque $\pi f$ of the articulated joint acting to the external member is represented by the following equation.

$$\pi f = \pi - \pi a$$

By using the Jacobian determinant JI, the reaction force IF is expressed by the following formula.

$$IF = (JI^t)^{-1} \cdot \pi f \quad (3)$$

The reaction force calculating section 18 sends the calculated reaction force IF to a correct track calculating section 20 via an on-off switch 19 which is closed in the impedance control mode. The correct track calculating section 20, serving as a position correcting means, calculates an impedance position correcting amount ΔP based on the reaction force information given from the reaction force calculating section 18.

More specifically, the impedance position correcting amount ΔP is obtained by introducing the following formulas.

$$IF = IM \cdot \ddot{X} + ID \cdot \dot{X} + IK \cdot X \quad (4)$$

where IM is an inertia matrix $$IM = \begin{pmatrix} m1 & \cdots & 0 \\ \vdots & \ddots & \vdots \\ 0 & \cdots & mn \end{pmatrix}$$

ID is an attenuation coefficient matrix $$ID = \begin{pmatrix} d1 & \cdots & 0 \\ \vdots & \ddots & \vdots \\ 0 & \cdots & dn \end{pmatrix}$$

IK is a stiffness matrix $$IK = \begin{pmatrix} k1 & \cdots & 0 \\ \vdots & \ddots & \vdots \\ 0 & \cdots & kn \end{pmatrix}$$

Accordingly, $$X = (IMS^2 + IDS + IK)^{-1} \cdot IF \quad (5)$$

From the formula (5), the impedance position correcting amount ΔP is derived in the following manner.

$$\Delta P = (IMS^2 + IDS + IK)^{-1} IF \quad (6)$$

Then, the correct track calculating section 20 sends the obtained impedance position correcting amount ΔP to the adder 14. The adder 14 sums the sampling position (i.e., provisional target position) given from the position/track generating section 11 and the impedance position correcting amount ΔP (=a negative value) given from the correct track calculating section 20. The summed-up value is supplied to the position command calculating section 12 as a feedback-controlled target position in the impedance control mode.

The reaction force calculating section 18 also sends the reaction force information to an action interrupt judging section 21. The action interrupt judging section 21 stores a threshold given from the user program analyzing section 10. This threshold is used to judge the properness of the reaction force acting on the working end 8 of the robot 1. The action interrupt judging section 21 compares the reaction force sent from the reaction force calculating section 18 with the threshold, and controls the on-and-off condition of an on-off switch 22 and also controls the switching condition of a selector switch 23 which serves as a switching means.

The on-off switch 22, interposed between the reaction force calculating section 18 and a decelerate/stop command calculating section 24, connects and disconnects the reaction force calculating section 18 to and from the decelerate/stop command calculating section 24. The selector switch 23 selectively connects either the position/track generating section 11 or a position/track correcting section 25 to the adder 14.

When the reaction force sent from the reaction force calculating section 18 exceeds the threshold given from the user program analyzing section 10, the action interrupt judging section 21 closes the on-off switch 22 to connect the reaction force calculating section 18 to the decelerate/stop command calculating section 24 and also switches the connecting terminal of selector switch 23 from the position/track generating section 11 to the position/track correcting section 25 so as to connect the position/track correcting section 25 to the adder 14.

When the on-off switch 22 is closed, the decelerate/stop command calculating section 24 receives the reaction force information (i.e., the actual reaction force acting on the working end 8 of the robot 1) from the reaction force calculating section 18 as well as a limit value of the reaction force (i.e., external force limit value) given from the user program analyzing section 10. Furthermore, the decelerate/stop command calculating section 24 receives the present target position from the adder 14. Thus, the decelerate/stop command calculating section 24 calculates a virtual pressing position so as to equalize the reaction force acting on the working end 8 of the robot 1 with the external force limit value. The decelerate/stop command calculating section 24 generates a stop command so that the obtained virtual pressing position becomes a stop position.

More specifically, the virtual pressing position is calculated by introducing the following formula.

$$IPr - IP1 = IK^{-1} \cdot IF_{Lim}$$

where IPr represents the virtual pressing position, and IP1 represents the present position of the robot 1, and $IF_{Lim}$ represents the external force limit value.

Accordingly, the virtual pressing position IPr is obtained in the following manner.

$$IPr = IP1 + IK^{-1} \cdot IF_{Lim} \quad (7)$$

The decelerate/stop command calculating section 24 sends the stop command thus determined according to the formula 7 to the position/track correcting section 25. The decelerate/stop command calculating section 24 and the position/track correcting section 25 cooperatively constitute a provisional target position correcting means. The position/track correcting section 25 obtains a deceleration pattern so that the working end 8 of the robot 1 can stop at the decelerate/stop position designated by the decelerate/stop command calculating section 24. The position/track correcting section 25 produces a corrected track of the working end 8 of the robot 1 based on the deceleration pattern thus obtained.

Then, the position/track correcting section 25 calculates the predictive position of the working end 8 of the robot 1 to be sampled at predetermined time intervals based on the corrected track. The predictive position thus calculated by the position/track correcting section 25 is sent to the adder 14 as a provisional target position. As the adder 14 adds the provisional target position thus received from the position/track correcting section 25 with the impedance position correcting amount ΔP sent from the correct track calculating section 20. The summed-up value is sent from the adder 14 to the position command calculating section 12.

The above-described robot control system operates in the following manner.

In the ordinary control mode, each of the on-off switches 19 and 22 is opened. The connecting terminal of selector switch 23 is connected to the position/track generating section 11 so as to connect the position/track generating section 11 to the adder 14. The sampling position to be outputted from the position/track generating section 11 at predetermined time intervals is given to the position command calculating section 12 as a target position. The position command calculating section 12 calculates the position of each articulated joint based on the target position and sends the calculated position to the actuating section 13 of each articulated joint.

The actuating section 13 compares the command position (i.e., calculative position) given from the position command calculating section 12 with the present position (i.e., actual position) given from the position detecting section 16 associated with the encoder 15. The actuating section 13 supplies the current (i.e., electric power) to each motor 9 based on a detected difference between the command position and the present position. With this control, the working end (i.e., flange) 8 of the robot 1 acts in compliance with the user program. For example, the robot 1 performs the assembling of parts or the like.

Meanwhile, the robot can be controlled in accordance with the impedance control mode which is prepared for finely controlling the reaction force acting on the working end 8 of the robot 1. For example, the robot 1 performs an operation for positioning a workpiece to a predetermined position with respect to the lathe and holding the workpiece with a lathe chuck. In such a case, the control unit 2 controls the robot 1 under the impedance control mode.

Figure 2A:
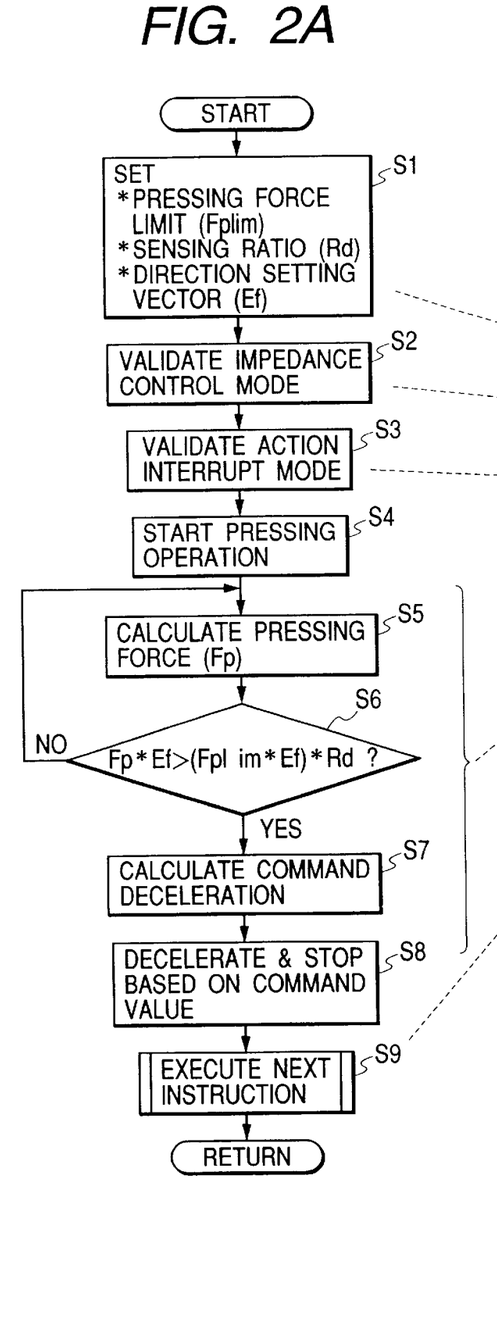
FIG. 2 is a flowchart showing an operation of the robot control system in accordance with the preferred embodiment of the present invention.

FIG. 2A is a flowchart showing the details of the impedance control performed by the robot control system.

Figure 2B:
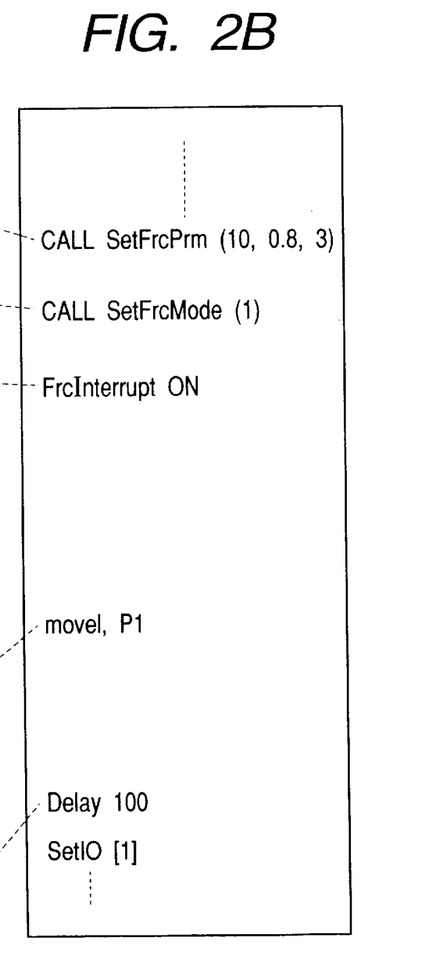

FIG. 2B shows the details of the user program relating to the impedance control. In this user program, "CALL SetFrcMode (1)" indicates commencement of an "action interrupt mode", and "CALL SetFrePrm" describes the conditions for commencing the "action interrupt mode."

Numerical values, i.e., 10, 0.8, and 3, in the parentheses of "CALL SetFrePrm", indicate a pressing force limit (Fplim), a sensing ratio (Rd), and a direction setting vector (Ef), respectively.

More specifically, when the reaction force acting in the direction setting vector (Ef) becomes equal to or larger than a predetermined threshold, the "action interrupt mode" begins. The predetermined threshold is a value obtained by multiplying the pressing force limit (Fplim) with the sensing ratio (Rd), where Rd <1.

According to the expression "CALL SetFrePrm (10,0.8, 3)" shown in FIG. 2B, it is understood that the pressing force acts in the direction "3" which is, for example, the Z axis of the coordinates having an origin at the working end 8 of the robot 1. Namely, the working end 8 of the robot 1 moves the workpiece in the Z-axis direction and presses the workpiece against the surface of the lathe chuck. The pressing force limit during the pressing operation is set to the level of 10 N(Newton). If the "action interrupt mode" starts immediately after the pressing force reaches the limit value, the actual pressing force will exceed the limit value due to an overshoot phenomenon. To eliminate such a problem, this embodiment starts the "action interrupt mode" at an earlier timing corresponding to the level of 8 N, i.e., 0.8×limit value.

In the impedance control mode, the user program analyzing section 10 reads the pressing force limit (Fplim), the sensing ratio (Rd), and the direction setting vector (Ef) involved in "CALL SetFrePrm." Then, the user program analyzing section 10 sends the threshold (i.e., 80% of the limit value) to the action interrupt judging section 21. Meanwhile, the user program analyzing section 10 sends the limit value to the decelerate/stop command calculating section 24 (refer to step S1).

As a preparation for commencing the impedance control mode, the on-off switch 19 is closed to connect the correct track calculating section 20 to the reaction force calculating section 18 (refer to step S2).

At the same time, the "action interrupt mode" is validated to compare the reaction force obtained by the reaction force calculating section 18 with the threshold (refer to step S3).

The robot 1 commences the operation for holding the workpiece and pressing it against the reference surface (refer to step S4).

In the "action interrupt mode", the action interrupt judging section 21 compares the threshold given from the user program analyzing section 10 with the reaction force sent from the reaction force calculating section 18 (refer to steps S5 and S6).

When the detected reaction force is not larger than the threshold (i.e., NO in the step S6), the impedance control is performed continuously.

Namely, the reaction force calculating section 18 calculates the reaction force acting on the working end 8 of the robot 1 based on the present position of each articulated joint and the current value of each motor 9. The reaction force calculating section 18 sends the calculated reaction force to the correct track calculating section 20 and also to the action interrupt judging section 21.

The correct track calculating section 20 calculates the impedance position correcting amount ΔP based on the reaction force information given from the reaction force calculating section 18. The calculated impedance position correcting amount ΔP is sent to the adder 14.

At this moment, the position/track generating section 11 is connected to the adder 14 via the selector switch 23. Thus, the adder 14 receives the sampling position based on the user program which is sent from the position/track generating section 11. Thus, the adder 14 adds the impedance position correcting amount ΔP sent from the correct track calculating section 20 with the sampling position sent from the position/track generating section 11. The adder 14 sends the summed-up value to the position command calculating section 12.

The position command calculating section 12 calculates the position of each articulated joint based on the target position given from the adder 14, and sends the calculative position of each articulated joint to the actuating section 13. The actuating section 13 actuates the motor 9 so that the present position (i.e., actual position) detected by the position detecting section 16 becomes equal to the command position (i.e., calculative position) given from the position command calculating section 12.

Figure 4:
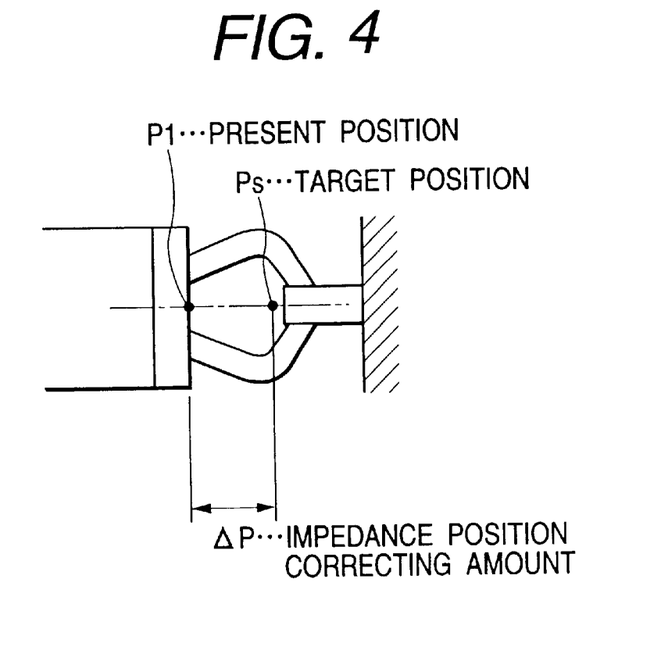
FIG. 4 is a view explaining an operation of the working end of the robot in accordance with the preferred embodiment of the present invention.

The above-described impedance control will be explained in more detail with reference to FIG. 4, in which Ps represents the target position of the working end 8 of the robot 1 and P1 represents the present position of the working end 8 of the robot 1. The correct track calculating section 20 sends the adder 14 the impedance position correcting amount ΔP which is calculated according to the formula 6. The adder 14 adds the impedance position correcting amount ΔP to the provisional target position (identical with the target position Ps in this case), and sends the summed-up value (i.e., corrected target position) to the position command calculating section 12. Accordingly, the motor 9 of each articulated joint is controlled so as to shift the working end 8 of the robot 1 to the position (Ps+ΔP), i.e., P1=Ps+ΔP. In this case, the reaction force acting on the working end 8 of the robot 1 is F=K·ΔP.

When the difference between the target position Ps and the present position P1 is increased, the reaction force acting on the working end 8 of the robot 1 may exceed the threshold.

When the reaction force exceeds the threshold (i.e., YES in the step S6), the action interrupt judging section 21 closes the on-off switch 22 to connect the reaction force calculating section 18 to the decelerate/stop command calculating section 24. Meanwhile, the action interrupt judging section 21 switches the connecting terminal of selector switch 23 from the position/track generating section 11 to the position/track correcting section 25 so as to connect the position/track correcting section 25 to the adder 14.

Thus, the decelerate/stop command calculating section 24 receives the reaction force information (i.e., the actual reaction force acting on the working end 8 of the robot 1) from the reaction force calculating section 18. The decelerate/stop command calculating section 24 obtains a virtual pressing position Pr where the reaction force becomes equal to the limit value (10N) stored in the user program. Namely, the virtual pressing position Pr is given as a sum of the present position P1 and a shifting amount corresponding to the limit value (10N). The decelerate/stop command calculating section 24 calculates a decelerate/stop command required for moving the working end 8 of the robot 1 from the present position P1 to the virtual pressing position Pr (refer to step S7).

The decelerate/stop command is sent to the position/track correcting section 25 so that the working end 8 of the robot 1 stops at the virtual pressing position Pr. The position/track correcting section 25 calculates the position of the robot working end 8 to be sampled at predetermined time intervals based on the given deceleration pattern. The adder 14 receives the calculated position from the position/track correcting section 25 as a provisional target position, instead of receiving the sampling position sent from the position/track generating section 11 (refer to step S8).

The adder 14 sums the virtual pressing position Pr and the impedance position correcting amount ΔP given from the correct track calculating section 20. The summed-up value is sent to the position command calculating section 12. As described above, the virtual pressing position Pr is given as a sum of the present position P1 and a shifting amount corresponding to the reaction force (10N). Thus, the adder 14 gives a new command position to the position command calculating section 12. The new command position is spaced from the virtual pressing position Pr by the impedance position correcting amount ΔP in the opposite direction (i.e., opposed to the pressing direction). In the steady condition, the command position agrees with the present position. In this manner, the impedance control is performed so that the reaction force of 10N accurately acts on the working end 8 of the robot 1.

Figure 5:
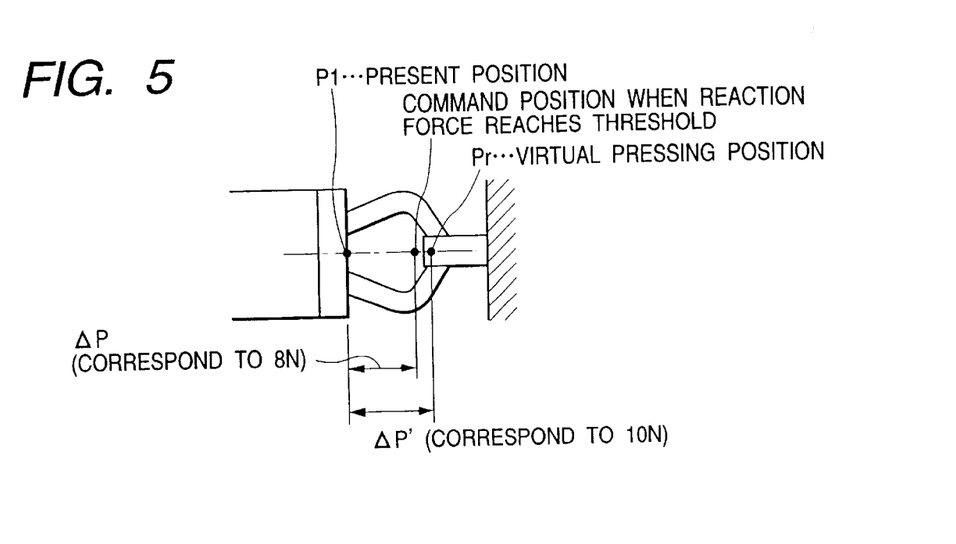
FIG. 5 is a view explaining an operation of the working end of the robot in accordance with the preferred embodiment of the present invention.

The impedance control of the present invention will be explained with reference to FIG. 5.

When the present position P1 of the robot working end 8 is spaced far from the target position Ps, the reaction force may exceed the threshold. In this case, the adder 14 receives the virtual pressing position Pr as a provisional target position which is spaced by a dislocation amount ΔP' from the present position P1 of the robot working end 8. The dislocation amount ΔP' is an amount causing the reaction force equivalent to the limit value (10N). The adder 14 sums the virtual pressing position Pr and the impedance position correcting amount ΔP calculated by the reaction force calculating section 18. The position command calculating section 12 receives the summed-up value as a new command position. The present position of the robot working end 8 is controlled so as to agree with the new command position. Thus, the reaction force acting on the robot working end 8 is smoothly equalized to the limit value (10N).

As described above, the operation for pressing the workpiece against the chuck surface is performed so as to suppress the reaction force within the threshold value. When the working end 8 of the robot 1 decelerates and finally stops at the designated position, the robot control goes on the next step (refer to step S9).

Figure 3:
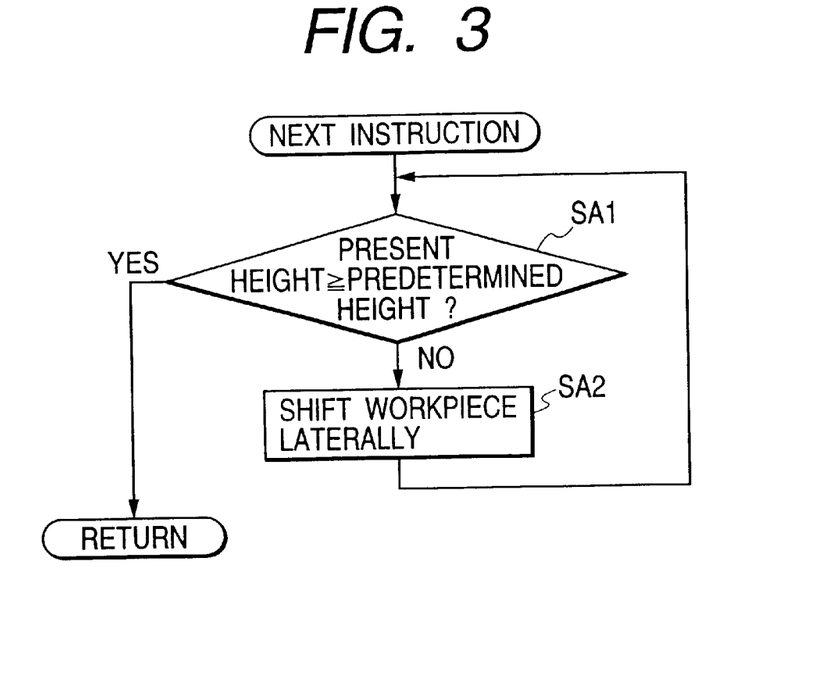
FIG. 3 is a flowchart showing another operation of the robot control system in accordance with the preferred embodiment of the present invention.

For example, as shown in FIG. 3, it is checked whether the present height is equal to or higher than a predetermined value. Namely, it is checked whether the working end 8 of the robot 1 has already advanced to the position where the workpiece is held by the chuck (refer to step SA1). When the judgement is NO in the step SA1, the workpiece is shifted along the chuck surface (refer to step SA2). When the workpiece is completely fitted into the chuck, the judgement becomes YES in the step SA1. Then, the control flow returns.

As described above, in the impedance control, when the reaction force acting on the working end 8 of the robot 1 exceeds a predetermined value, a virtual position is obtained so as to equalize the reaction force to the limit value. The obtained virtual position, serving as a provisional target position, is added to the impedance position correcting amount. Thus, the actual reaction force acting on the working end 8 of the robot 1 does not exceed the limit value and is maintained at an adequate level. Accordingly, in the impedance control, it becomes possible to properly adjust the reaction force to a predetermined value.

The present invention is not limited to the above-described embodiment. For example, the reaction force calculating section 18 can be replaced by a force sensor.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A robot control system comprising:
   a reaction force detecting means for detecting a reaction force acting on a working end of a robot;
   a position correcting means for setting a position correcting amount corresponding to the reaction force detected by said reaction force detecting means;
   an adding means for producing a target position by adding said position correcting amount obtained by said position correcting means to a given provisional target position;
   a provisional target position correcting means for obtaining a virtual position of said working end of said robot based on a present target position generated from said adding means, said virtual position being a position where the reaction force detected by said reaction force detecting means becomes equal to a predetermined limit value;

a switching means for sending said virtual position obtained by said provisional target position correcting means to said adding means instead of sending said given provisional target position when the reaction force detected by said reaction force detecting means exceeds a predetermined value smaller than said limit value;

a position detecting means for detecting a present position of each articulated joint of said robot; and an actuating means for feedback controlling said articulated joint of said robot to shift said working end of said robot to said target position based on said position detected by said position detecting means.

2. A robot control system comprising an impedance control section and an action interrupt section, said impedance control section comprises:
  a reaction force detecting means for detecting a reaction force acting on a working end of a robot;
  a position correcting means for setting a position correcting amount corresponding to the reaction force detected by said reaction force detecting means;
  a target position generating means for producing a target position of the working end of said robot based on said position correcting amount obtained by said position correcting means;
  a position command generating means for sending a designated position of each articulated joint of said robot based on said target position of said working end;
  a position detecting means for detecting a present position of each articulated joint of said robot, and
  an actuating means for feedback controlling said articulated joint to eliminate a difference between said designated position sent from said position command generating means and said present position detected by said position detecting means, said action interrupt section comprises:
  an action interrupt judging means for checking whether said reaction force exceeds a predetermined threshold;
  a provisional target position correcting means, being responsive to the judgement of said action interrupt judging means, for obtaining a virtual position of said working end of said robot when said reaction force exceeds said predetermined threshold; and
  a switching means, being responsive to the judgement of said action interrupt judging means, for sending said virtual position obtained by said provisional target position correcting means to said target position generating means when said reaction force exceeds said predetermined threshold.

3. The robot control system in accordance with claim 2, wherein said virtual position is a position where the reaction force detected by said reaction force detecting means becomes equal to a predetermined limit value.

4. The robot control system in accordance with claim 2, wherein said threshold is smaller than said limit value.

* * * * *